United States Patent [19]

Bruning

[11] Patent Number: 5,060,625
[45] Date of Patent: Oct. 29, 1991

[54] IGNITION SYSTEM WIRING HARNESS AND SPRING CLIP RETAINERS THEREFOR

[75] Inventor: E. Eugene Bruning, Normal, Ill.

[73] Assignee: Caterpillar Inc., Peoria, Ill.

[21] Appl. No.: 625,255

[22] Filed: Dec. 10, 1990

[51] Int. Cl.⁵ ............... F02P 23/00; F02P 3/12; F02F 7/00
[52] U.S. Cl. ............... 123/647; 123/195 E; 123/143 C
[58] Field of Search ............ 123/647, 143 C, 195 E, 123/198 R, 195 R, 195 A, 198 E

[56] References Cited

U.S. PATENT DOCUMENTS

| | | | |
|---|---|---|---|
| 1,073,183 | 12/1912 | Grego | 123/143 C |
| 1,133,525 | 3/1915 | Zika | 123/143 C |
| 1,607,636 | 11/1926 | MacPherson | 123/143 C |
| 1,619,991 | 3/1927 | Swarr | 123/143 C |
| 2,474,510 | 1/1949 | Arthur | 123/195 E |
| 2,686,509 | 8/1954 | Drinkard | 123/143 |
| 4,404,951 | 9/1983 | Zechlin et al. | 123/647 |
| 4,515,141 | 5/1985 | Saaf et al. | 123/647 |
| 4,706,639 | 11/1987 | Boyer et al. | 123/647 |
| 4,762,111 | 8/1988 | Hanafura et al. | 123/647 |

OTHER PUBLICATIONS

Pp. 1 and 11 of SAE Technical Paper Series 881856 dated Nov. 7-10, 1988, and entitled "The Caterpillar 3176 Heavy Duty Engine", by J. E. Sibley et al.

*Primary Examiner*—Raymond A. Nelli
*Attorney, Agent, or Firm*—John W. Grant

[57] ABSTRACT

Ignition system wiring harnesses are used to carry discrete electrical signals to the fuel igniter devices of spark ignited engines. Externally mounted wiring harnesses are subjected to damage which can cause the engine to run inefficiently. The subject ignition system wiring harness extends through internal passageways in an engine block and a plurality of cylinder heads mounted thereon. The wiring harness is retained at fixed locations by a plurality of spring clip retainers, each of which has a normally flat elongate spring clip deflected around the wiring harness and slidably extending through a pair of slots in a bracket. The spring clip exerts a nearly constant force on the wiring harness as it tries to straighten to its normally flat condition regardless of the cross sectional size of the wiring harness. Thus, one size of spring clip retainer can be used for various sizes of wiring harness. Moreover, the wiring harness of the present invention is protected from the damage by the surrounding structure of the engine.

6 Claims, 3 Drawing Sheets

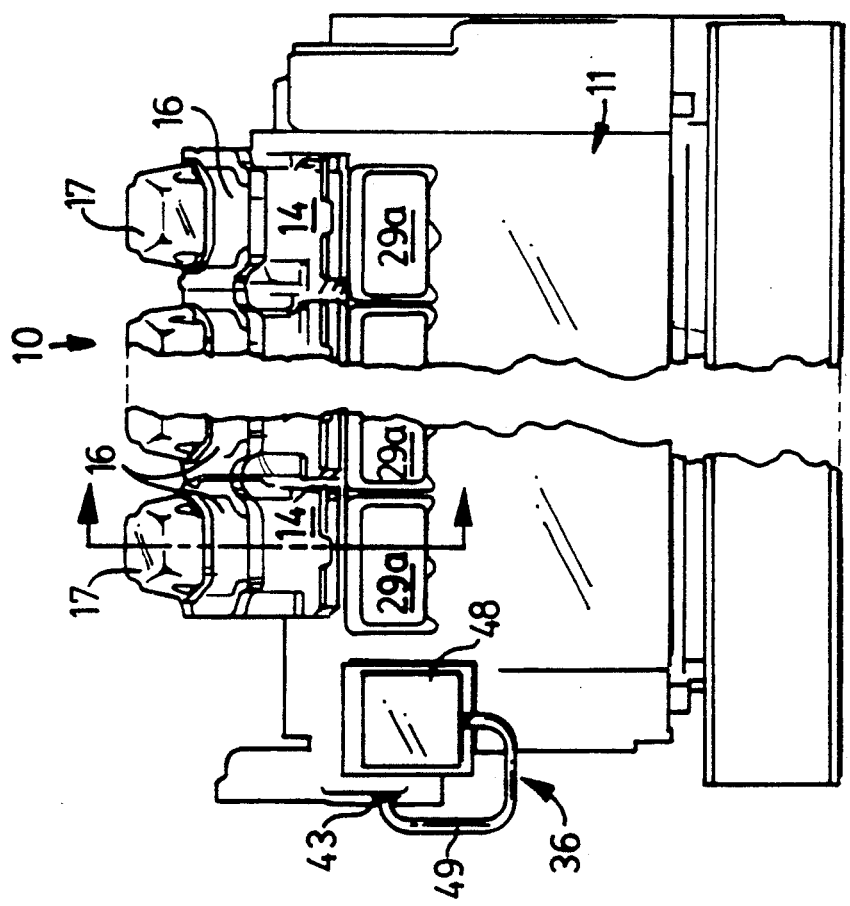
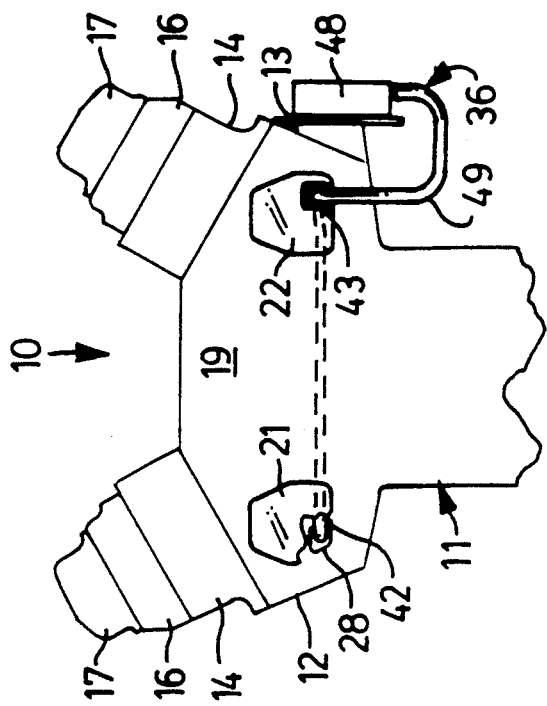

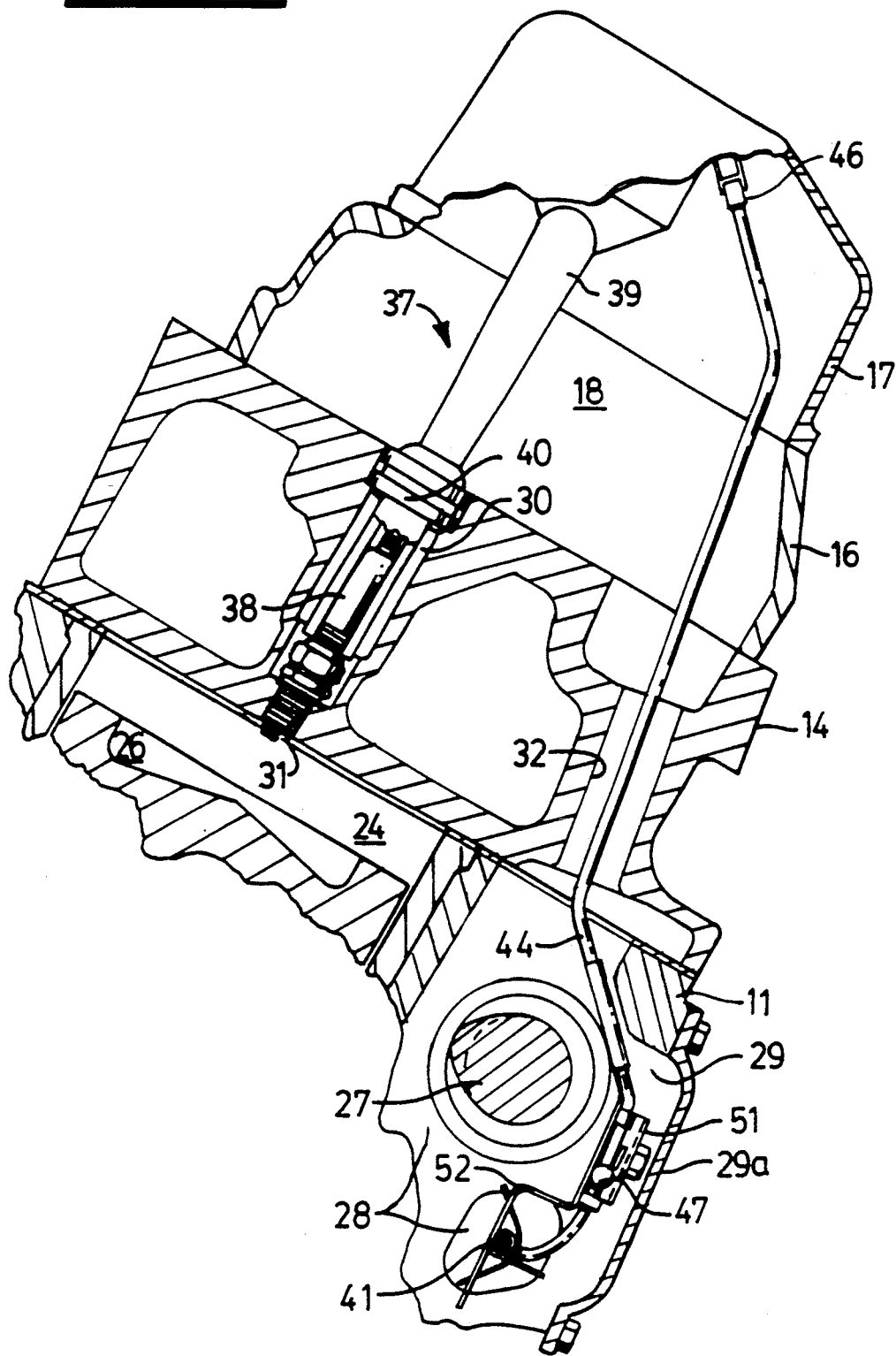
Fig_3_

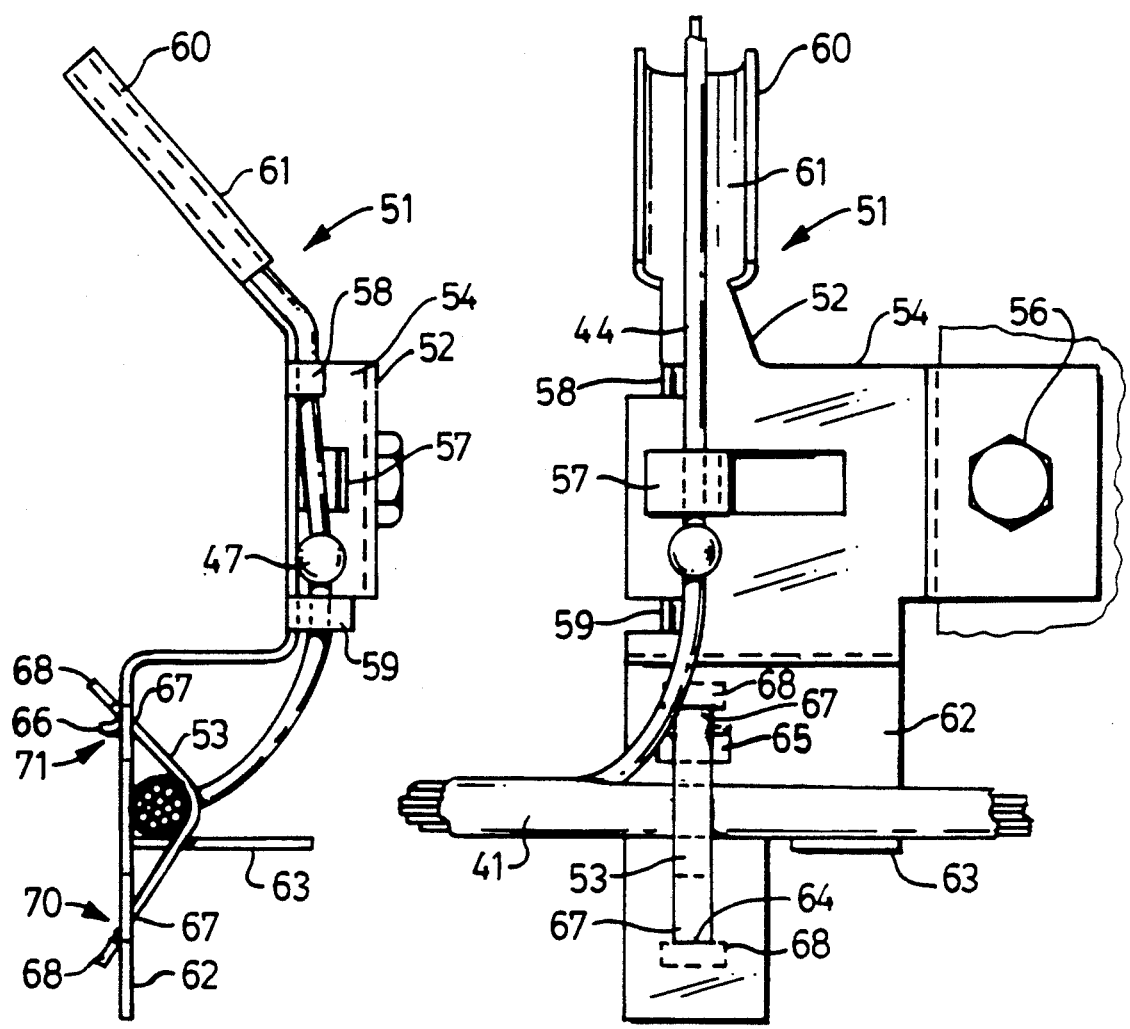

IGNITION SYSTEM WIRING HARNESS AND SPRING CLIP RETAINERS THEREFOR

DESCRIPTION

1. Technical Field

This invention relates to an ignition system and more particularly to a wiring harness thereof and to a spring clip retainer to hold the wiring harness away from moving components of the engine.

2. Background Art

Some of today's spark ignited engines have a coil provided for each of the spark plugs. The coils of such engines are mounted externally of the valve cover and connected to the spark plug through an insulated extender. The ignition wires connected to the coil are also mounted externally of the engine. Some of such engines are quite large and routine maintenance of the engine requires that the service personnel climb onto the engine. One of the problems encountered with the previous ignition arrangement is that the service personnel frequently use the coil and/or external ignition wiring as handholds for climbing onto the engine. Such usage leads to damage of the ignition system components and thereby causes the engine to run inefficiently until the damaged component is replaced.

The ignition wiring of the above-described ignition system is commonly contained in a wiring harness and has lead wires pigtailed off the main wiring harness at spaced intervals for connection to the coils. Thus, the size of the main wiring harness decreases throughout its length. As an example, the wiring harness of some engines start out with sixteen lead wires and end up with only two lead wires. The wiring harness is usually fastened to the engine at various locations with a properly sized retaining clip placed around the harness and bolted to the engine. For the retaining clip to be effective, it must firmly hold the wiring harness. One of the problems encountered therewith is that several different sizes of retaining clips are required because of the decreasing size of the wiring harness. Thus, several sizes of the retaining clips must be stocked in inventory.

It is desirable to enclose the components of the ignition system most vulnerable to damage within a protective enclosure. It is also desirable to provide a retainer for fastening the wiring harness to the engine and which automatically compensates for the decreasing size of the harness so that only one sized retainer is needed. It is also desirable for the retainer to be designed so that unintentional separation of the components thereof is prevented.

The present invention is directed to overcoming one or more of the problems as set forth above.

Disclosure of the Invention

In one aspect of the present invention, an electronic ignition system is provided for an internal combustion engine having a block, a plurality of cylinder bores in the block, cylinder head means mounted on the block and having a plurality of threaded bores individually opening into the cylinder bores, and cover means connected to the cylinder head means and cooperating therewith to define enclosed compartment means. The ignition system comprises a plurality of electrically energized fuel igniter means individually threaded into the threaded bores in the cylinder head means, means defining a longitudinally extending passageway in the block and extending substantially the length of the block, means defining a plurality of connecting passageways in the cylinder head means and communicating the longitudinally extending passageway with the compartment means, a plurality of electrical lead wires bundled into a wiring harness and having a plurality of pigtails branched therefrom at spaced intervals, said wiring harness extending through the longitudinally extending passageway with the pigtails extending through the connecting passageways and being connected to the fuel igniter means, and means for retaining the wire harness and the pigtails at fixed locations relative to the block.

In another aspect of the present invention, a spring clip retainer for firmly holding a flexible elongate members of various cross sectional sizes comprises a bracket having spaced apart slots therein, a normally flat elongate spring clip deflected around the wiring harness and having opposite end portions slidably extending through the slots in the bracket, and means for retaining at least one of the end portions in the respective slot.

BRIEF DESCRIPTION OF THE DRAWINGS

FIG. 1 is a diagrammatic side elevational view of an engine with many of the external components removed for illustrative convenience;

FIG. 2 is a diagrammatic end view of the engine of FIG. 1;

FIG. 3 is a somewhat enlarged partial sectional view taken along line 3—3 of FIG. 1;

FIG. 4 is a somewhat enlarged side view of one of the components of the present invention; and FIG. 5 is a side view of the component of FIG. 4.

BEST MODE FOR CARRYING OUT THE INVENTION

Referring now to the drawings, a multi-cylinder internal combustion engine 10 includes a block 11 of general V-shape design having opposite banks 12,13, cylinder head means including a plurality of cylinder heads 114 mounted on the block and spaced along its longitudinally length, a plurality of valve cover bases 16 fastened to the cylinder heads 14 and a plurality of valve covers 17 suitably mounted to the valve cover bases in a conventional manner and collectively providing cover means to define valve compartment means in the form of a plurality of valve compartments, one shown at 18 on FIG. 3. A timing gear cover 19 is conventionally fastened to the front of the block 11 to enclose the various timing gears not shown. A pair of cover plates 21,22 are fastened to the gear cover 19 to enclose access openings therein.

Each of the banks 12,13 includes a plurality of cylinder bores 24 longitudinally spaced along the block in the usual manner with each cylinder bore slidably receiving a piston 26. Each bank 12,13 rotatably carries an elongate camshaft 27 extending longitudinally through the block in a usual manner. A passageway generally indicated at 28 extends longitudinally through each bank of the block generally in the vicinity of the camshaft 27 with the passageway 28 including a plurality of longitudinally spaced compartments, one shown at 29, through which the camshaft passes. Each of the compartments 29 is closed with a cover plate 29a suitably fastened to the block.

Each of the cylinder heads 14 has a cylindrical pocket 30 and a threaded bore 31 opening into the respective cylinder bore 24 in the block 11. The cylinder heads conventionally carry the intake and exhaust valves and valve operating mechanism, not shown, in the usual manner. Each of the cylinder heads also has a connecting passageway 32 communicating the longitudinally extending passageway 28 with the valve compartment 18. While the drawings of this embodiment show individual cylinder heads associated with each cylinder bore, alternatively, two or more of the cylinder heads 24 may be combined into a single cylinder head wherein each cylinder head would thereby include the appropriate number of threaded bores 31 and connecting passageways 32. The valve cover bases 16 and valve covers 17 would likewise be suitably combined.

An electronic ignition system, partially shown at 36, for igniting the fuel/air mixture in the cylinder bores 24 includes a plurality of electrically energized fuel ignitor means 37 individually threaded into the threaded bores 31 in the cylinder heads 14. Each of the fuel igniter means includes a spark plug 38 threaded into the threaded bore 31 and a coil assembly 39 which extends into the pocket 30 and is suitably connected to the spark plug. A seal 40 carried by the coil assembly 39 is in sealing contact with the cylinder head. The coil assembly 39 is retained at the position shown in FIG. 3 by contact with the valve cover 17.

As best shown on FIGS. 2 and 3, the electronic ignition system 36 also includes a plurality of electrical lead wires bundled into a pair of wiring harnesses 41,42 connected to an electrical bulkhead connector 43 mounted to and extending through the cover plate 22. The wiring harness 41 extends into the longitudinally extending passageway 28 of the bank 13 of the block 11. The wiring harness 42 extends across the width of the block inside the gear cover 19 and similarly extends into the longitudinally extending passageway 28 in the bank 12 of the block 11. The lead wires in the wiring harnesses are provided in pairs with the terminal end portions of each pair forming a separate pigtail 44 branched off the main wiring harness at spaced intervals. Each pigtail 44 extends through an associated one of the connecting passageways 32 and into the associated valve compartment 18 where it is connected to the coil assembly 39 through an electrical connector 46. An enlarged nodule 47 is formed on each pigtail 44. A control module 48 is suitably fastened to the side of the block 11 and is connected to the bulkhead connector 43 through a multi-lead cable 49.

A plurality of spring clip retainers, one shown at 51 in FIG. 3, are individually fastened to the block 11 in proximity to the connecting passageway 32 to prevent the wiring harnesses 41,42 from contacting the moving parts of the engine. As best shown on FIGS. 4 and 5, each retainer includes a bracket 52 and an elongate resilient spring clip 53. The bracket 52 is disposed in the compartment 29 and constructed from a sheet metal plate and has a main portion 54 suitably connected to the block 11 with a cap screw 56. An offset tab 57 is spaced from the main portion and forms a "U" shaped channel which receives one of the pigtails 44. A pair of spaced apart lugs 58,59 extend outwardly from the main portion on opposite sides of the tab 57 to retain the pigtail within the channel formed by the tab. The nodule 47 on each pigtail is sized to make contact with the tab which limits the pigtail length to the coil assembly 39 thereby preventing the pigtail from contacting the moving components in the valve compartment 18.

The bracket 52 also has an arm 60 extending upwardly and inwardly from the main portion 54 between the camshaft 27 and the block 11. The associated pigtail 44 lays in a "U" shape channel 61 in the arm 60. A wiring harness support portion 62 extends inwardly and downwardly from the main portion 54 and has an outwardly extending leg 63 for supporting the wiring harness. The support portion 62 has a rectangular slot 64 and a "T" shaped slot 65 extending therethrough. A pair of outwardly extending tabs 66 are formed adjacent the "T" shaped slot 65 on opposite sides thereof.

The spring clip 53 is normally flat in its free state and has opposite end portions 67, each of which has an enlarged end 68 which in this embodiment is "T" shaped. The spring clip 53 is made from a spring steel which has been austempered. The spring clip 53 is resiliently deflected around the wiring harness carried by the leg 63 and extends through the slots 64,65 in the bracket 52. The relative widths of the rectangular slot 64 and the end portions 67 of the spring clip are selected so that one of the end portions is freely slidable within the rectangular slot. Similarly, the relative widths of the "T" shaped slot 65 and the end portions 67 of the spring clip are selected so that the other end portion is freely slidable within the "T" shaped slot and the enlarged end 68 adapted to engage the tabs 66. The length of the rectangular slot is selected so that the respective enlarged end of the spring clip 53 can pass therethrough and the spring clip rotated 90 degrees to trap the enlarged end on the underneath side of the support portion 62. The size relationship of the respective enlarged end and the rectangular slot constitute a means 70 for retaining the spring clip within the rectangular slot. The enlarged end and the tabs 66 constitute a means 71 for retaining the spring clip within the "T" shaped slot.

INDUSTRIAL APPLICABILITY

In use the brackets 52 are fastened to the block 11 with the cap screws 56. The wiring harnesses 41,42 are then inserted through the respective longitudinally extending passageway 28 in the banks 12,13 of the block and are supported by the legs 63 of the brackets. One of the enlarged ends 68 of one of the spring clips 53 is inserted through the rectangular slot 64 of the bracket and then rotated 90 degrees so that the enlarged end is oriented to engage the support portion 62 to retain the spring clip in the slot. The clip is then deflected around the wiring harness and the other enlarged end 68 inserted through the "T" shaped slot 65 so that it is positioned to engage the tabs 66. The spring clip 53 exerts a nearly constant force on the wiring harness as it tries to straighten to its normally flat condition regardless of the cross sectional size of the wiring harness Each of the remaining brackets 53 similarly receive one of the spring clips. The pigtails 44 are then individually inserted through the "U" shape channel 61 formed in the arm 60 and through the connecting passageways 32 and connected to the coil assemblies 39.

In view of the above, it is readily apparent that the structure of the present invention provides an improved electronic ignition system which is not susceptible to damage from external sources. This is accomplished by mounting the coil assemblies within the valve compartments and routing the wiring harness internally within the confines of the engine where they are protected by the structural components of the engine. This invention also provides an improved spring clip retainer which automatically compensates for variations in wiring harness cross-section so that one size spring clip retainer can be used to firmly hold a wiring harness having various sizes of cross-section. The spring clips are assembled by hand and do not require special hand tools. If an external force is applied to the wiring harness after the spring clip is assembled, one of the enlarged ends engages the bracket adjacent the rectangular slot while the other enlarged end engages the pair of outwardly extending tabs adjacent the "T" shaped slot to prevent unintentional disassembly.

Other aspects, objects, and advantages of this invention can be obtained from a study of the drawings, the disclosure, and the appended claims.

I claim:

1. An electronic ignition system for an internal combustion engine having a block, a plurality of cylinder bores defined in the block, cylinder head means mounted on the block and having a plurality of threaded bores individually opening into the cylinder bores, and cover means connected to the cylinder head means and cooperating therewith to define enclosed compartment means, comprising:

a plurality of electrically energized fuel igniter means individually threaded into the threaded bores in the cylinder head means and disposed within the compartment means;

means defining a longitudinally extending passageway in the block and extending substantially the length of the block;

means defining a plurality of connecting passageways in the cylinder head means for communicating the longitudinally extending passageway with the compartment means;

a plurality of electrical lead wires bundled into a wiring harness having a plurality of pigtails branched therefrom at spaced intervals, said wiring harness extending through the longitudinally extending passageway with the pigtails extending through the connecting passageways and being connected to the fuel igniter means; and means for retaining the wiring harness and the pigtails at fixed locations relative to the block.

2. The electronic ignition system of claim 1 wherein the retaining means includes a plurality of spring clip retainers disposed within the longitudinally extending passageway and fastened to the block.

3. The electronic ignition system of claim 2 wherein each of the spring clip retainers includes a bracket having spaced apart slots with one of said slots being "T" shaped and a normally flat elongate spring clip deflected around the wiring harness and having opposite end portions slidably extending through the slots in the bracket with each of the end portions having an enlarged end thereon.

4. The electronic ignition system of claim 3 wherein said enlarged ends of the spring clip are "T" shaped.

5. The electronic ignition system of claim 4 wherein each of said pigtails has an enlarged nodule formed thereon and adapted to engage the bracket.

6. The electronic ignition system of claim 5 wherein each of the fuel igniter means includes a spark plug threaded into the associated threaded bore in the cylinder head means and a coil assembly connected to the spark plug.

* * * * *